United States Patent

Von Haas et al.

[11] Patent Number: 5,836,723
[45] Date of Patent: Nov. 17, 1998

[54] MACHINING TOOL

[75] Inventors: Rainer Von Haas, Geesthacht; Willi Jester, Herten, both of Germany

[73] Assignee: Widia GmbH, Essen, Germany

[21] Appl. No.: 737,101
[22] PCT Filed: Jan. 7, 1995
[86] PCT No.: PCT/DE95/00018
§ 371 Date: Oct. 25, 1996
§ 102(e) Date: Oct. 25, 1996
[87] PCT Pub. No.: WO95/29781
PCT Pub. Date: Nov. 9, 1995

[30] Foreign Application Priority Data

May 3, 1994 [DE] Germany ............ 44 15 425.9

[51] Int. Cl.$^6$ ............ B23B 27/16; B23B 29/04
[52] U.S. Cl. ............ 407/107; 407/102; 407/113
[58] Field of Search ............ 407/102, 103, 407/104, 106, 107, 113

[56] References Cited

U.S. PATENT DOCUMENTS

| 2,870,523 | 1/1959 | Richard ............ 407/107 X |
| 5,682,803 | 11/1997 | Boianjiu ............ 407/102 X |
| 5,702,210 | 12/1997 | Boianjiu ............ 407/114 X |

FOREIGN PATENT DOCUMENTS

| 0 074 601 A1 | 3/1983 | European Pat. Off. . | |
| 0 094 537 A1 | 11/1983 | European Pat. Off. . | |
| 150901 | 8/1985 | European Pat. Off. | 407/113 |
| 0 232 692 A3 | 8/1987 | European Pat. Off. . | |
| 325897 | 8/1989 | European Pat. Off. | 407/107 |
| 0 568 515 A1 | 11/1993 | European Pat. Off. . | |
| 2 052 070 | 4/1971 | France . | |
| 2552874 | 6/1977 | Germany | 407/107 |
| 29 36 869 A1 | 3/1981 | Germany . | |
| 38 38 816 A1 | 5/1990 | Germany . | |
| 42 40 295 A1 | 6/1993 | Germany . | |
| 42 25 822 C1 | 2/1994 | Germany . | |
| 1738479 | 6/1992 | U.S.S.R. | 407/107 |
| 1 088 465 | 10/1967 | United Kingdom . | |

*Primary Examiner*—Andrea L. Pitts
*Assistant Examiner*—Henry W. H. Tsai
*Attorney, Agent, or Firm*—Herbert Dubno; Andrew Wilford

[57] ABSTRACT

A tool assembly has a tool holder having a holder support face, a clamping dog having a dog surface spaced from and facing the holder support face, and a tool between the holder and the dog and having an end cutting edge, a face directly confronting the support face, and a surface directly confronting the dog surface. One of the surfaces is formed with a recess and the other surface is formed with a bump engageable in the recess. The dog surface can be pressed in a clamping direction generally perpendicular to the faces and surfaces toward the support surface and to clamp the tool between the dog and the support. The bump and recess are so dimensioned that they engage each other at at least three locations spaced from one another perpendicular to the clamping direction.

19 Claims, 9 Drawing Sheets

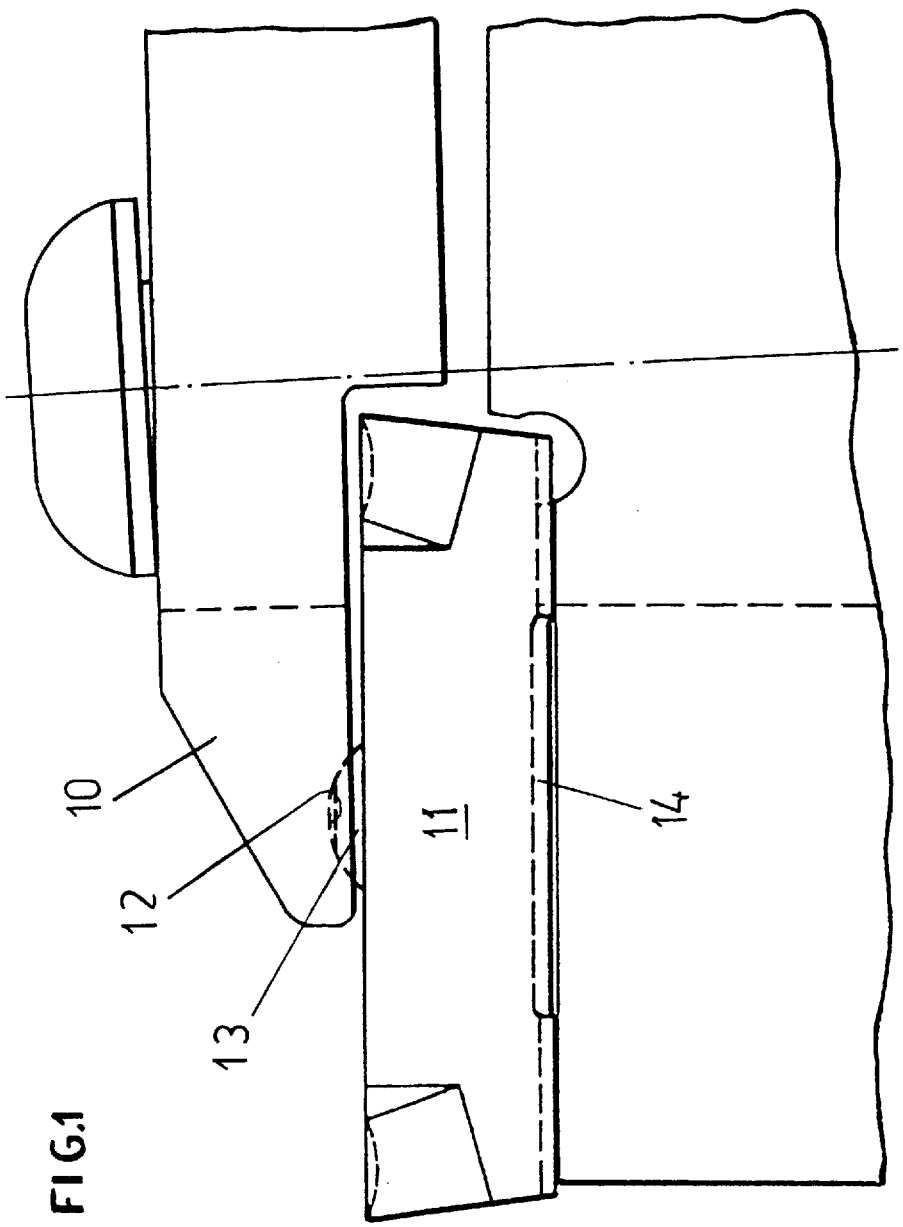

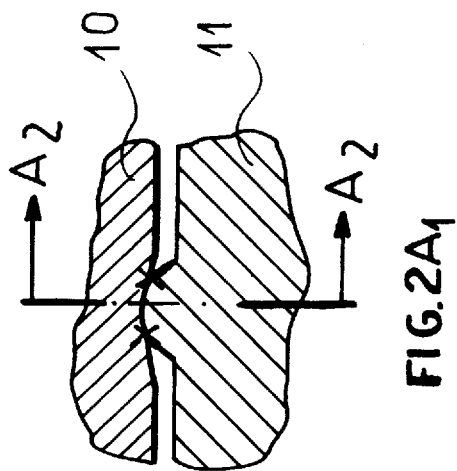
FIG.2A₁
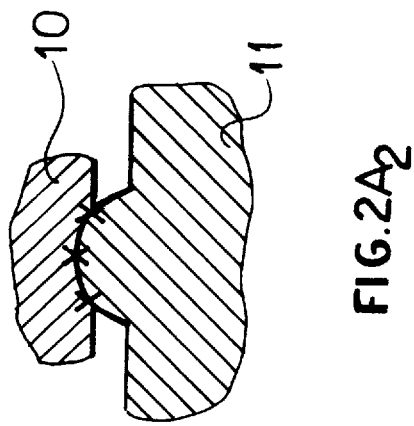
FIG.2A₂
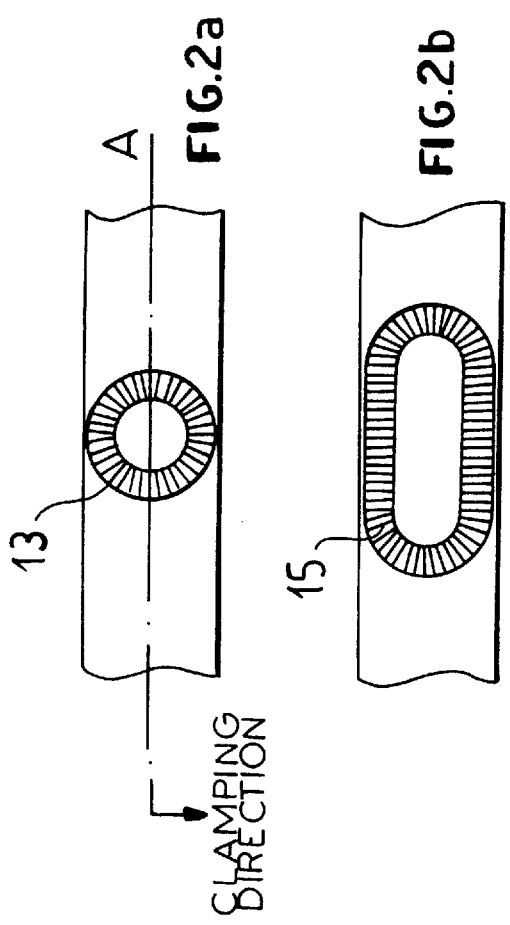
FIG.2a
FIG.2b
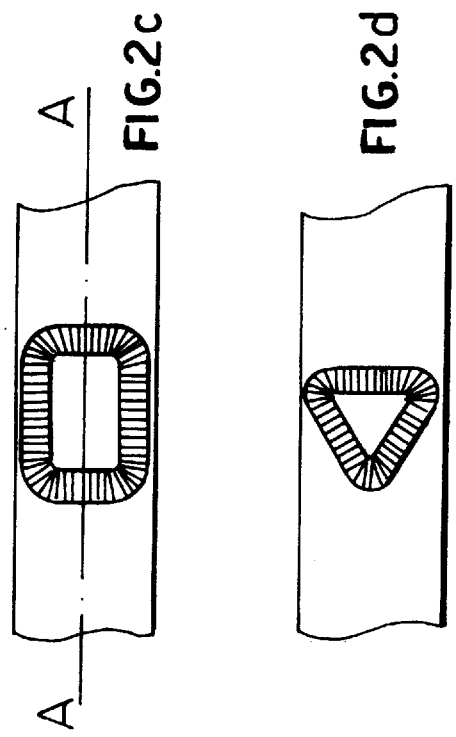
FIG.2c
FIG.2d

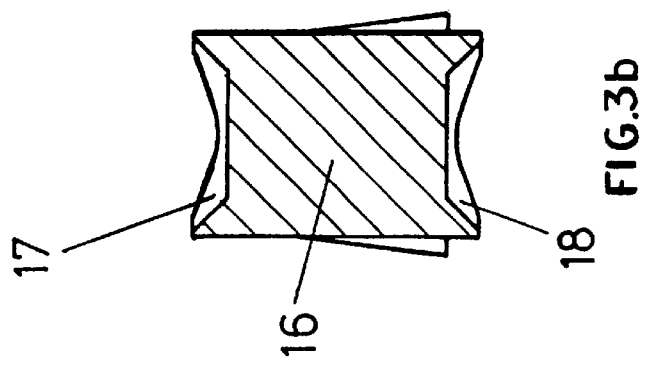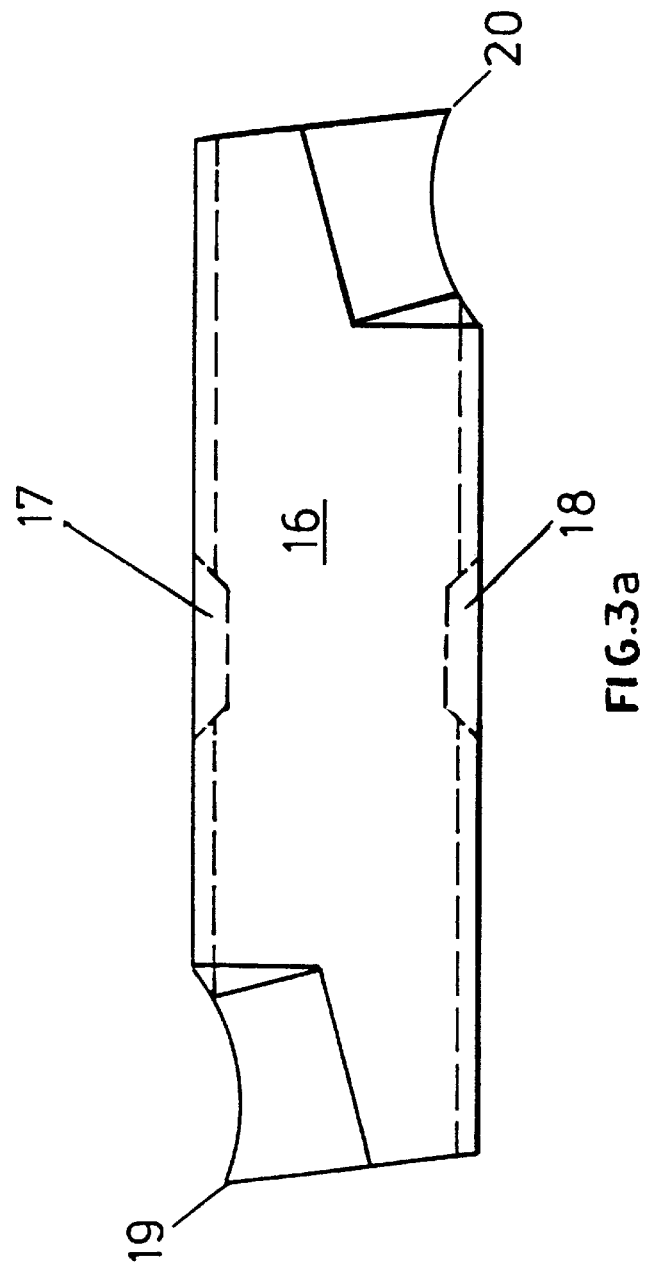

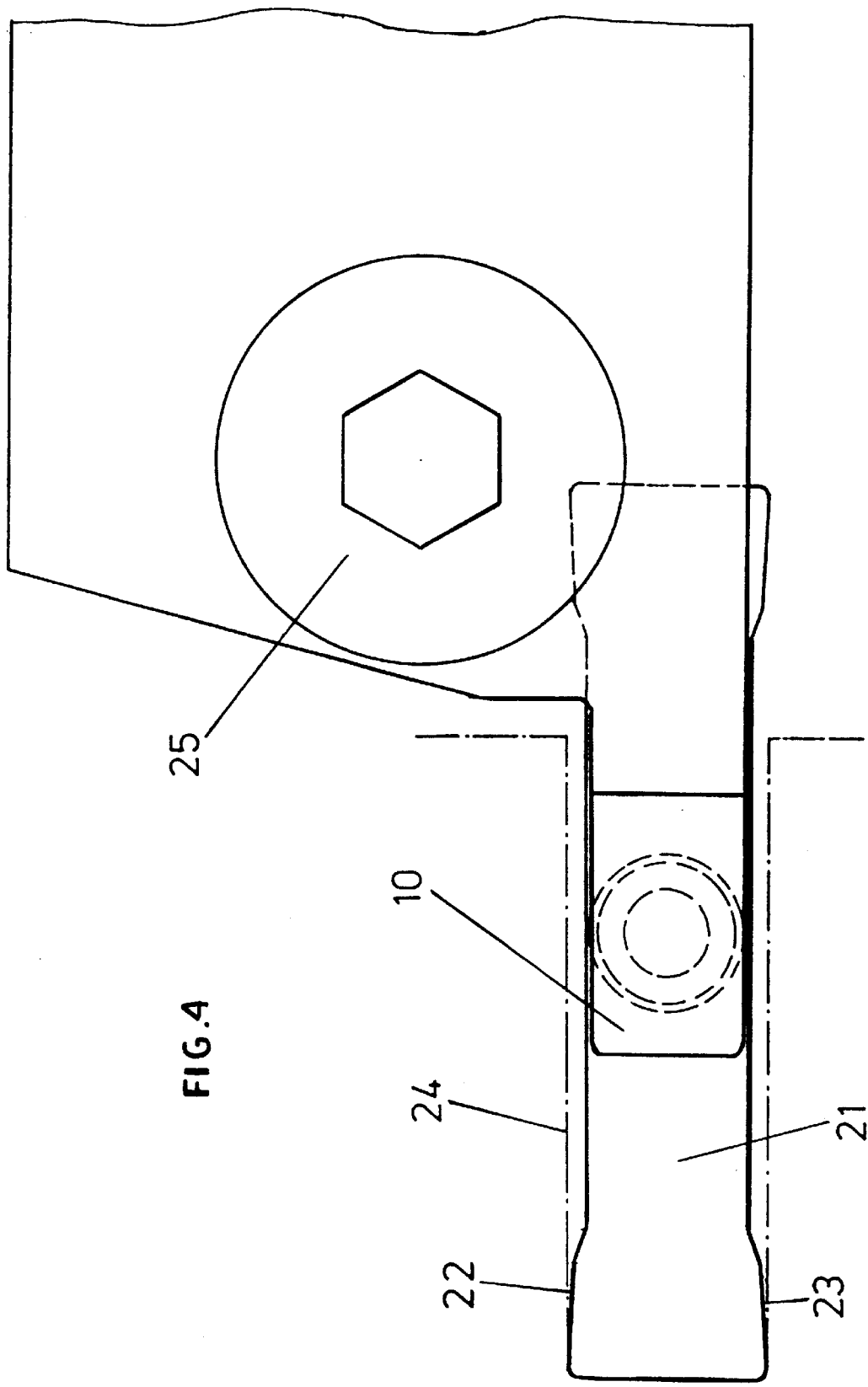

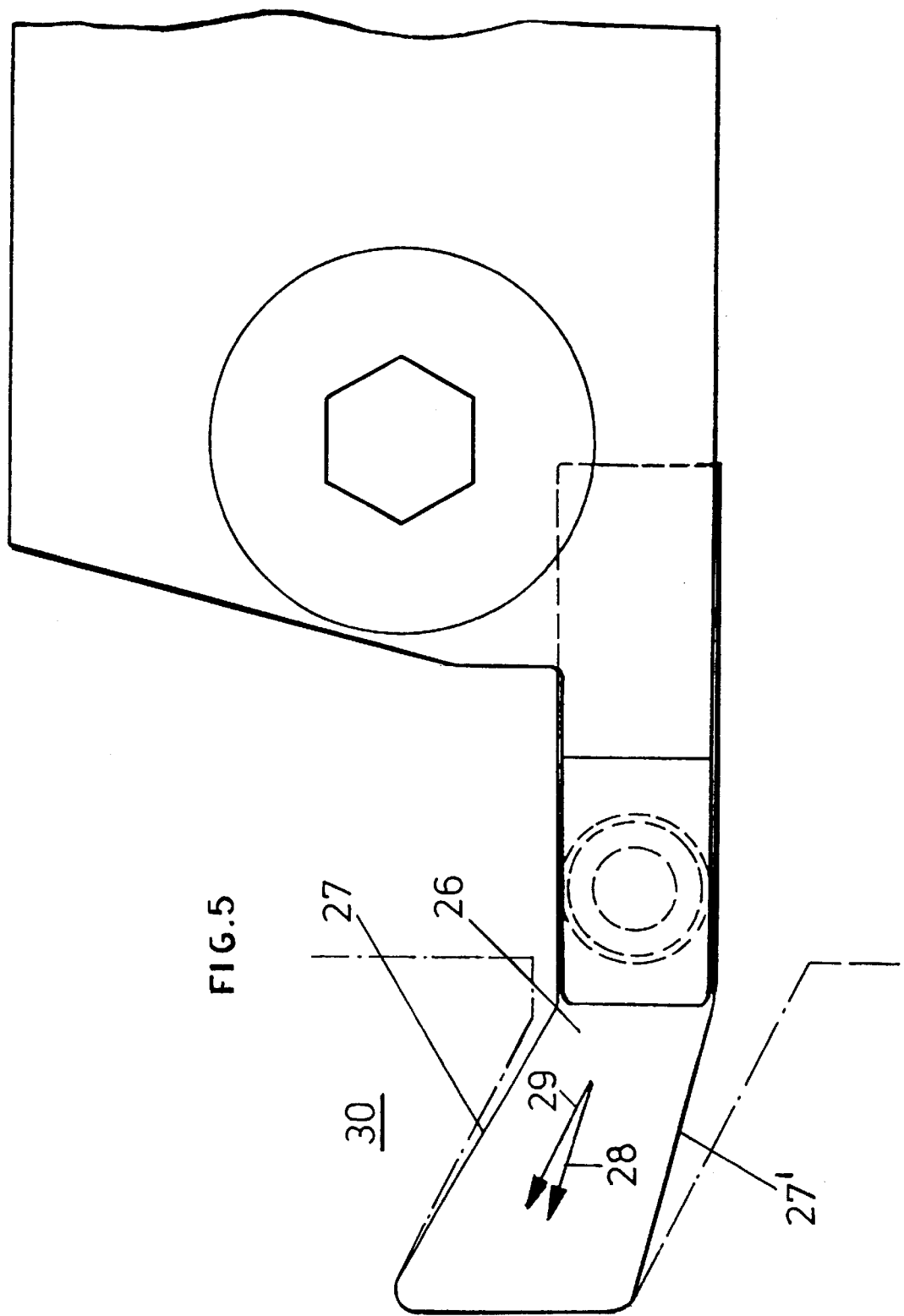

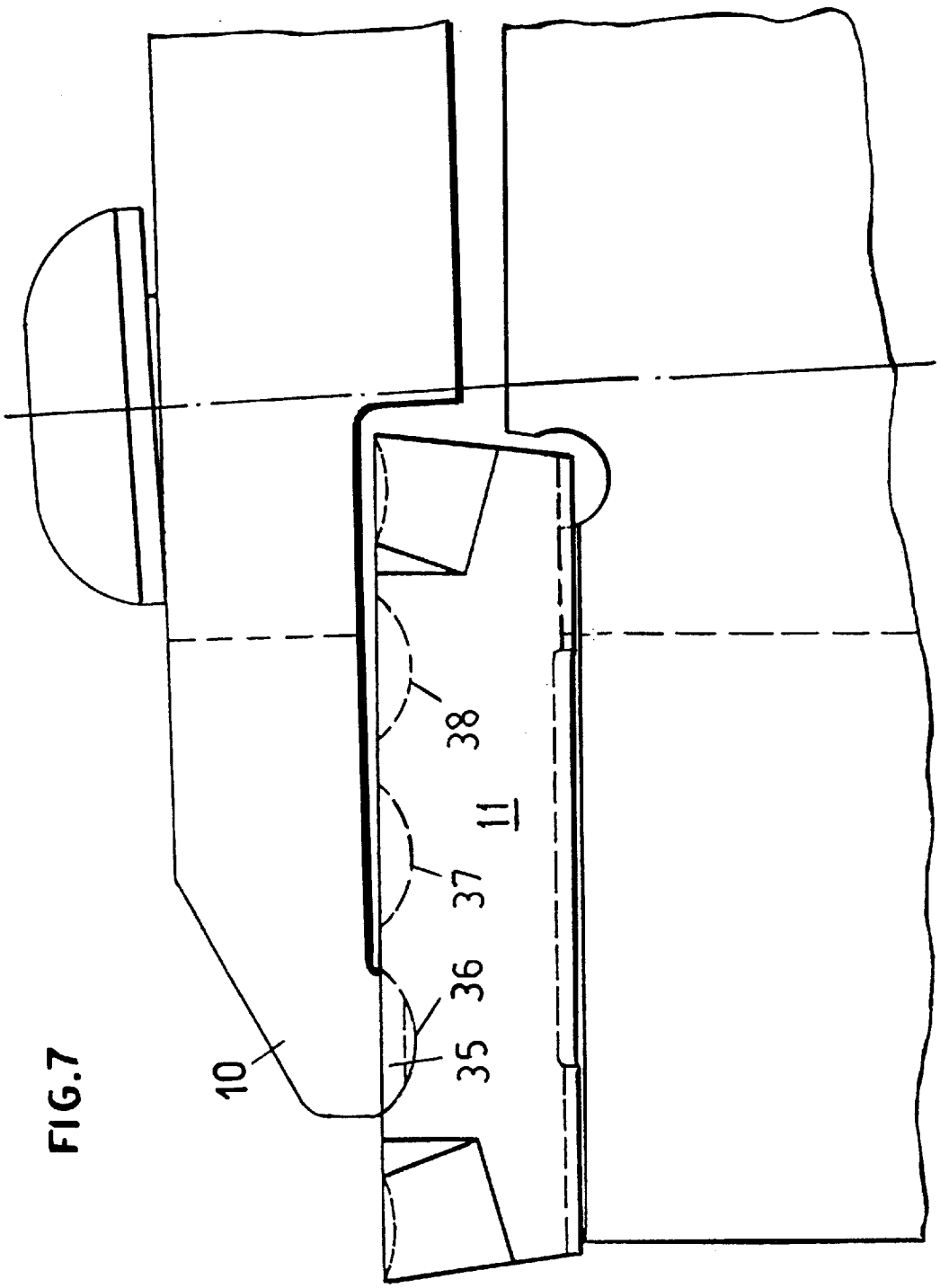

MACHINING TOOL

CROSS-REFERENCE TO RELATED APPLICATIONS

This application is the US national phase of PCT application PCT/DE95/00018 filed 7 Jan. 1995 with a claim to the priority of German patent application P 44 15 425.9 filed 3 May 1994.

FIELD OF THE INVENTION

The present invention relates to a machining tool with a cutting insert releasably held by a clamp dog in a tool holder. More particularly this invention concerns a parting tool.

BACKGROUND OF THE INVENTION

It is for example known from German patent document 3,434,089 to clamp a parting tool by means of a longitudinally slidable retaining blade against a tool holder by actuating a retaining screw. The corresponding clamp surfaces of the clamp plate as well as of the cutting insert each have a prismatic shape.

A clamping system is known from German patent document 3,219,150 where the cutting insert and the upper clamp jaw are provided with a stop limiting insertion so that when the stop is subjected to high pressure it swings back lever fashion and lets the cutting insert into the clamping gap. The opposite cutting-insert and clamping-arm clamp surfaces serving for transmitting and withstanding the vertical clamping forces are set to diverge from one another in the direction of the closed end of the clamping gap.

A machining tool is suggested in European patent document 0,388,688 whose tool holder and cutting insert each have interengaging prismatic clamp surfaces of which one interengaging pair of clamp surfaces is set at an angle to exert a force on the cutting insert toward the open end of the clamping gap when the clamp arm is pressed by the retaining screw on the cutting insert. This creates a pincer-like engagement of the cutting insert. The disadvantage of this embodiment is that, when the retaining screw is tightened, the cutting insert is shifted before the vertical clamping force is sufficient to hold the cutting insert down in the seat. As a result of the prismatic shape of the upper clamp surface and the angled underlying clamp surface the cutting insert can become canted. The described clamp surfaces can also be formed convex or concave.

U.S. Pat. No. 3,894,322 describes a tool that has four clamp surfaces that run parallel to the cutting edge or edges and that form in cross section a parallelogram. The clamp jaws are complementarily shaped so that when the retaining screw is tightened the upper clamp jaw presses the cutting insert into the seat. This cutting insert is however only retained against shifting perpendicular to the cutting edge, not against transverse shifting, that is parallel to the cutting edge.

OBJECT OF THE INVENTION

It is an object of the present invention to further develop the machining tool of the above-described type so that the cutting insert is retained against movement in any direction.

SUMMERY OF THE INVENTION

This object is obtained according to the instant invention by a machining tool wherein This object is attained by the machining tool according to claim 1 that is characterized according to the invention in the clamp dog has on its side turned toward the cutting insert a clamp bump which engages in a corresponding cutting-insert recess or a clamp recess which engages over a corresponding cutting-insert projection, the clamp bump engaging on the cutting-insert recess or the clamp recess engaging on the cutting-insert projection at three or more points such that the cutting insert is secured in all directions, in particularly horizontally, that is perpendicular to the clamping direction. The support face of the tool and of the cutting insert are preferably formed prismatic.

Furthermore preferably the clamp bump or clamp recess on the one side and/or the corresponding cutting-insert recess or cutting-insert projection on the other side have the shape of a three, four-, or more-sided frustopyramid, a part-spherical or ellipsoidal rotation surface or a semispherical or ellipsoidal body of revolution or a elongated round shape with angled side surfaces seen in top view.

In generally, in particular with ceramic cutting inserts, clamp recesses are known in which a part-spherical clamp dog or a part-spherical clamp bump should engage, but point contact is made between the ball head and the cutting-insert recess so that the cutting insert is pressed backward in the plate seat when clamped. In contrast thereto the tool according to the invention is shaped such that the clamping force engages generally vertically via the clamp dog and presses the cutting insert down into the plate seat without shifting it backward or forward perpendicular to the tool-holder plate seat. This has the advantage that the cutting insert can be positioned freely on the opposite side at the active cutting edge relative o the tool holder. The clamping action is at three or more locations which preferably form an equilateral and equiangular triangle so even at the very start of the clamping operation it is impossible for the cutting insert to move horizontally relative t the vertical clamping force. According to the invention respective part-spherical surfaces. of a bump or recess can lie on a planar surface or part-spherical surfaces with the same or different radii can lie against each other or any warped surface on planar or even warped surfaces can lie against each other so long as they meet the requirements that the cutting insert cannot be shifted or deflected to the side during clamping. This is achieved according to an embodiment of the invention in that when clamped at least three points or at least three or more in n-corners of a surface seen in top view of the clamp dog and of the cutting insert engage one another or that the clamping is all-around over 360°, that is when respective part-spherical bumps or disks as projections or recesses lie against each other. The same is true for ellipsoidal bodies of revolution or bumps as well as elongated oval clamp bumps or recesses.

Preferably the frustopyramid angle lies between 150° and 90°.

The position of the cutting insert on the tool holder is defined with a clamp bump and a cutting-insert recess. In order also to have some variability here, according to a further embodiment of the invention the cutting insert has several adjacent recesses and/or projections with a clamp dog having only one clamp bump or clamp recess. In this manner it is possible to provide several eccentric clamp recesses so that after turning of a multiple-edge tool the respective next clamp recess or with 180° rotation the opposite clamp recess is used for engagement with the clamp dog.

The clamp dog can be part of a self-tightening or screw-actuated clamp jaw or of a (centered and mounted without play in all directions) retaining claw.

According to a further embodiment of the invention the cutting insert has an at least partially prismatic bottom surface which is held in a complementary prismatic plate seat or has in its bottom surface preferably across from the recess or bump a recess for forming a hollow bottom-surface region. In this manner the stability of the clamped tool is improved since the danger of any rocking effects caused by a nonplanar cutting-insert bottom surface or foreign particles lodged thereon is minimized.

According to another feature of the invention an axial guide groove extends from a clamp recess or from a cutting-insert recess to the front end of the clamp dog and facilitates axial movement of the cutting insert on insertion or removal with lateral guiding preferably with sufficient play. This makes it easy for the user to change the cutting insert, it being guided on insertion into the clamp arm until the cutting-insert projection lies across from the clamp recess or cutting-insert recess. Preferably the cutting insert has a prismatic bottom surface in which a prismatic support surface of the holder is guided. The prismatic lower guiding as well as the guiding of the clamp arm prevents lateral tipping of the cutting insert during insertion or removal of the cutting insert. The clamp recess or the cutting-insert recess and the cutting-insert projection or the clamp bump are formed part spherical. The clamp recess of the clamp dog preferably has a smaller radius than the radius of the cutting-insert projection. The same is true for the radius of the cutting-insert recess relative to the radius of the clamp bump. The depth of the guide groove is smaller than the depth of the clamp recess or the width of the guide groove is smaller than the width of the clamp recess. Preferably the guide groove has a constant radius and a uniform depth along its longitudinal axis, preferably forming a part-cylindrical cutout. The radius of the guide groove advantageously corresponds to the radius of the cutting-insert projection or of the clamp bump. The effective of this construction is that the cutting insert with its preferably part-spherical cutting-insert projection or the clamp bump can be slid into the guide groove or the part-cylindrical cutout with sufficient play up to a position in which the cutting insert with its rear free surface engages a cutting-insert (tool) carrier surface or engages with the cutting-insert projection or the clamp bump on the rear surface of the clamp recess or cutting-insert recess. The depth dimensions are set such that during sliding in or out when not clamped the cutting insert cannot tip about its longitudinal axis. During insertion the cutting-insert projection lies underneath the part-cylindrical cutout so that after tightening of the clamp dog the cutting insert is positioned such that by corresponding movement of the clamp arm on the cutting insert it is also held against withdrawal. The particular advantage of these steps is that the cutting insert can be clamped in any position of the tool holder, even if overhead, without danger of positioning it wrong since the clamp recess of the part-spherical cutting-insert projection and with it the cutting insert are centered by the clamping operation, e.g. when the retaining screw is tightened. If the radius of curvature of the clamp recess n the clamp dog is smaller than the radius of curvature of the part-spherical cutting-insert projection there is a relatively large clamp engagement surface at the largest diameter of the engaging surfaces between the clamp recess and the cutting-insert projection. The same is true with use of a clamp bump and a cutting-insert recess.

The cutting insert can be made us as a double-ended indexable parting insert. According to a further embodiment further variants are possible in that the parting tool has a secondary cutting edge extending up to a main cutting edge and extending at an angle to it and to a cutting-insert shaft side surface.

According to another embodiment of this cutting insert a back cutting edge can run to a side cutting edge and extend generally parallel to the front main cutting edge. These embodiments are possible since the cutting insert is held by the clamping in all directions, thus for example on back cutting is not drawn out of the plate seat as is still possible in practically all known clamping systems according to the prior art. In particular the parting insert can be asymmetrically formed relative to its longitudinal axis, in order to be suitable for special operations when doing inside turning.

BRIEF DESCRIPTION OF THE DRAWINGS

Embodiments of the invention are shown in the drawing. Therein in schematic representation:

FIG. 1 is a side view of a parting insert clamped in a tool holder;

FIGS. 2a through 2d show respective embodiments of the clamp bump or recess of the corresponding cutting-insert projections or recesses;

Figure 6:
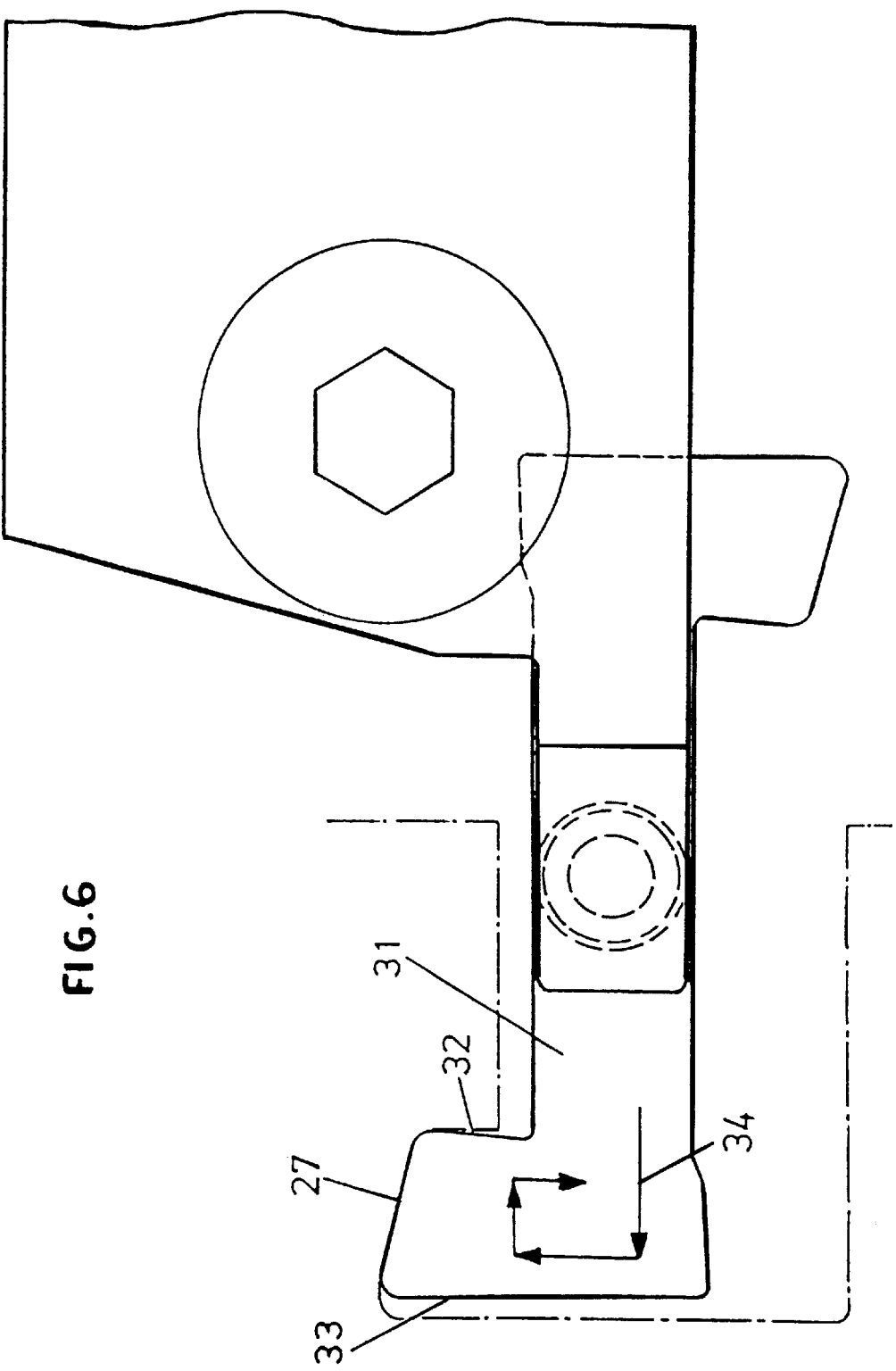
Figure 9:
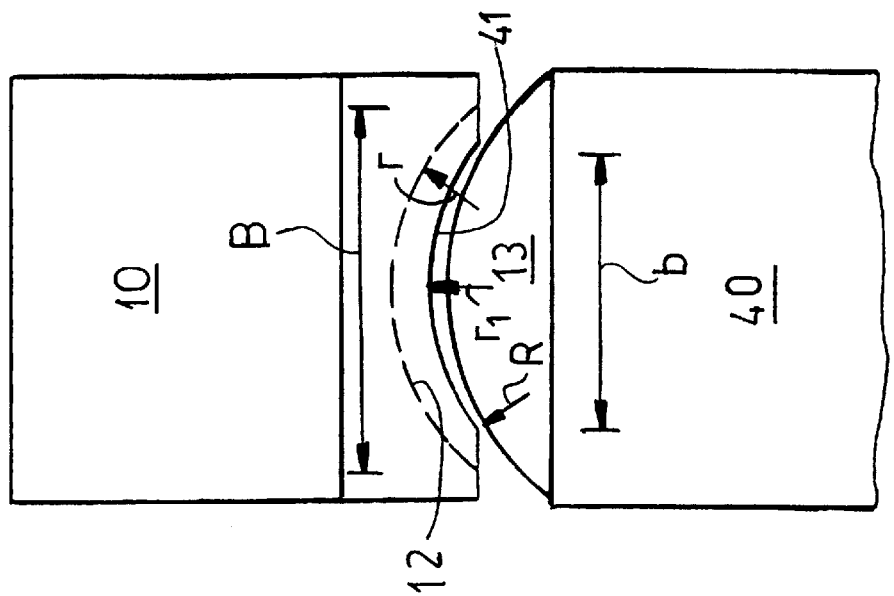
Figure 8:
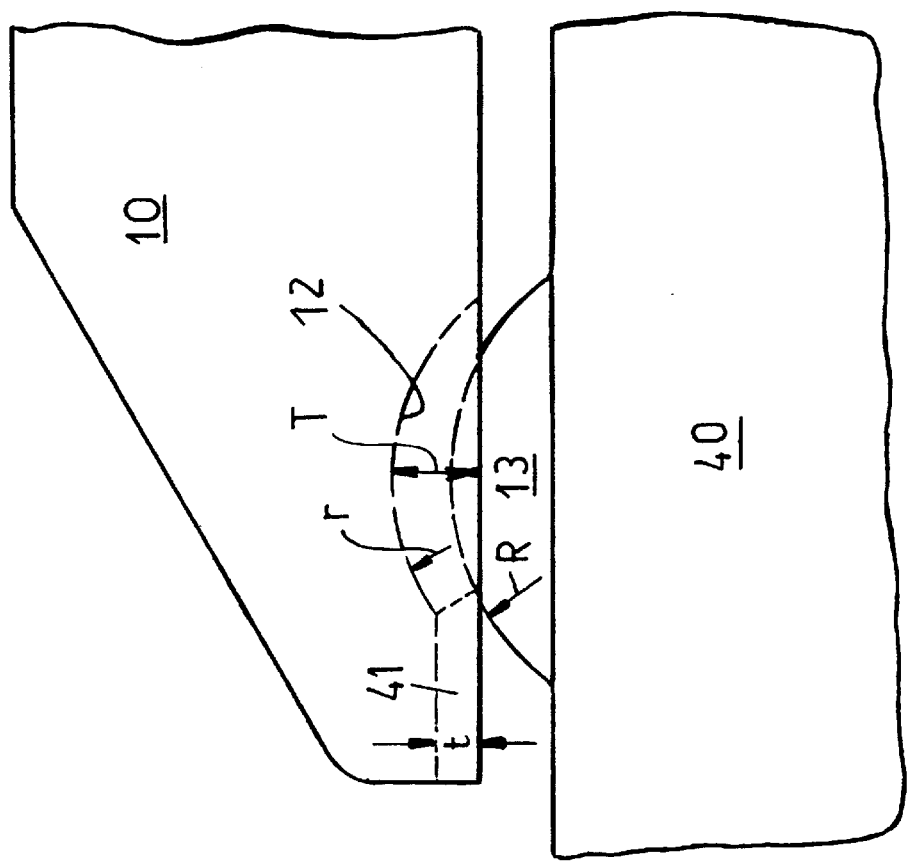
Figure 11:
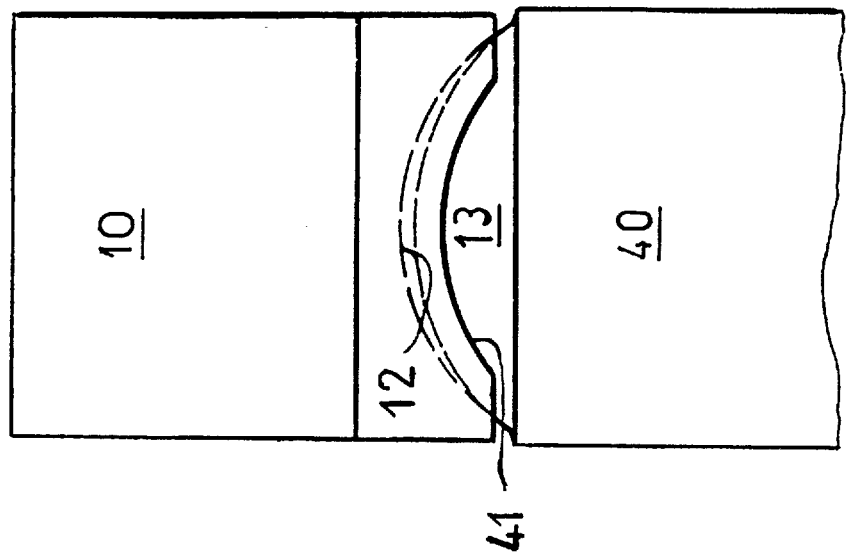
Figure 10:
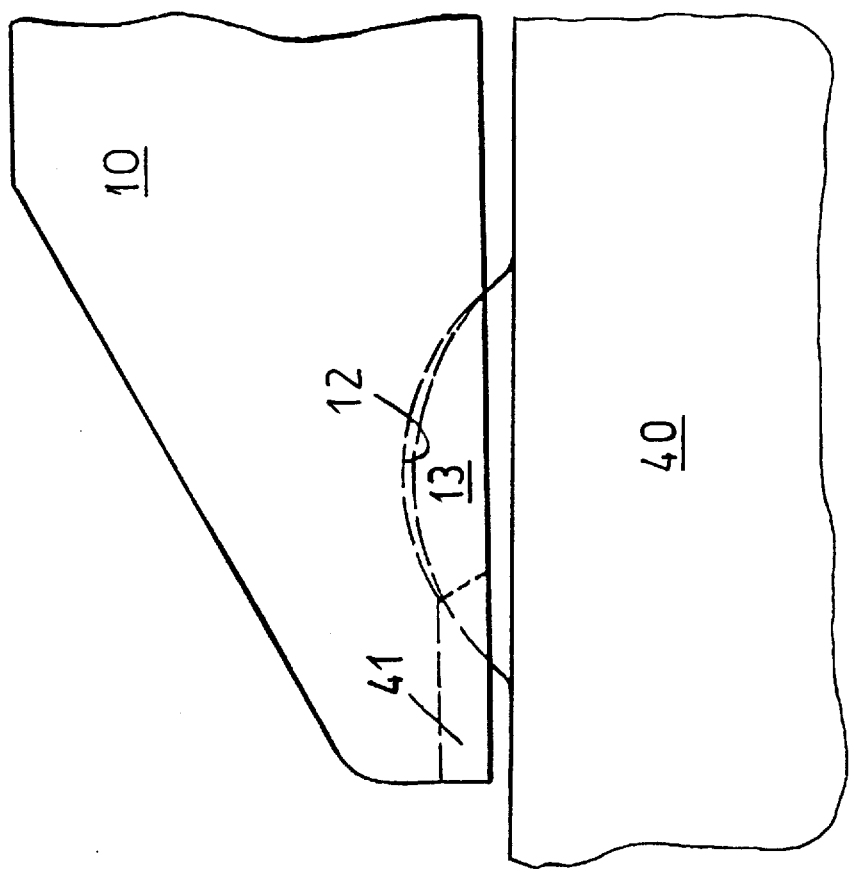

FIG. $2a_1$, is an axial side view of the embodiment shown if FIG. 2a;

FIG. $2a_2$ is a sectional view of the embodiment shown in FIG. $2a_1$ taken along lines $a_2$—$a_2$ in a direction perpendicular to the axis A—A and a clamping direction CD;

FIGS. 3a and 3b are a front and side view of a double-ended cutting insert;

FIG. 4 is a top view of a parting insert held clamped in a tool holder;

FIGS. 5 and 6 are top views of novel parting tools in a clamp of a tool holder;

FIG. 7 is a side view of a further tool according to the invention;

FIG. 8 is a partial side view of a clamp dog as part of a tool holder and a partial view of the cutting insert in unclamped condition;

FIG. 9 is an end view of the structure according to FIG. 8;

FIGS. 10 and 11 are views like FIGS. 8 and 9 of the parts in the clamped condition.

SPECIFIC DESCRIPTION

The present invention is generally usable for all types of cutting inserts that are self-clamping or held by actuation of a clamp screw via a retaining claw in a tool holder. The clamping is done by a clamp dog 10 that has on its underside, that is the side turned toward the cutting insert 11 extending in turn along a longitudinal axis A—A seen in FIG. 2a, a clamp recess 12 which in this case is shaped part-spherical, that is with a constant radius of curvature. This clamp dog engages over a part-spherical disk 13 as a raised part of the retaining surface of the cutting insert 11. The radius of curvature of the part-spherical disk 13 corresponds to the radius of curvature of the part-spherical clamp-claw recess. Correspondingly the clamp dog 10 can be provided with a clamp bump, that is a raised part, and the cutting insert 11 with a clamp recess, that is a depressed part. In this case the cutting insert has on its prismatically formed underside another recess 14 that forms a hollow bottom-surface region.

As discussed above the bumps or recesses can be part-spherical or ellipsoidal bodies of revolution or other rounded surfaces or even planar surfaces. According to FIG. 2a which is a top view according to FIG. 1 the cutting insert has a raised part in the retaining surface in the shape of a part-spherical disk that gives annular all-around force transmission from the clamp dog to the cutting insert. The tool is restrained after tightening in every possible direction in the view plane, that is various tool operations can be carried out without having to worry about pulling the cutting insert out of the clamp seat. This is in particular true for the case when the clamping force is not brought exactly vertical, that is when the part-spherical recess engages at an angle from above on the part-spherical disk.

FIGS. $2a_1$ and $2a_2$ illustrate a contact line between the engages recesses and bump. Understandably for the mechanical stability the engages elements have to have at least three contact points "x" in order to reliably clamp each other.

According to the embodiment of FIG. 2b the raised or recessed part can have the shape 15 of an ellipsoidal body of revolution which can be varied to an elongated rounded shape with two parallel straight sides.

According to FIG. 2c the hatched surfaces that are active in clamping extend as a rectangle to one other, that is the raised and/or recessed region has a frustopyramidal shape. The least number of such surfaces is achieved by the triangular frustopyramid of FIG. 2d. In accordance with the invention the side flanks of the frustopyramid can also be rounded. It is also possible to combine raised regions or bumps with depressed regions, that is for example to make the clamp bump part-spherical and the recess frustopyramidal as shown in FIGS. 2c and 2d so long as one ensures that the cutting insert is retained in all directions against horizontal shifting.

Thus for example according to FIGS. 3a and 3b a double-ended indexable cutting insert 15 is provided which has an upper and/or a lower frustopyramidal recess 17 or 18 as well as cutting edges 19 and 20.

FIGS. 4 through 6 show various parting tools, the parting tool 21 according to FIG. 4 being shaped symmetrically relative to its longitudinal axis, that is in particular the secondary edges 22 and 23 each form with the longitudinal axis or the sides of the shaft the same acute angle. The cutting insert is held against being pulled out when withdrawn from the cut groove 24. The clamping is effected by a retaining screw 25 which presses the clamp dog 10 onto the cutting insert 21.

According to FIG. 5 the parting tool 26 has an asymmetrical shape, that is the two secondary cutting edges 27 and 27' extend not parallel or at the same angle or in the same angular direction (positive or negative) so that cutting movements can be carried out in the direction of the arrow 28 or of the arrow 29 in the workpiece 30. The parting tool 31 according to FIG. 6 is formed asymmetrically seen from above, in particular it has a rear cutting edge 32, a secondary cutting edge 27, as well as a main cutting edge 33 so that movement of the tool as shown by the arrows 34 is possible, that is a forward plunge, a lateral plunge, as well as a reverse movement.

In addition with the novel clamping all types of parting tools are possible which are used in variously directed turning operations where upper and lower clamping are effected by the clamp dog and the prismatic cutting-insert/plate-seat engagement and lateral shifting is achieved by the annularly effective clamping according to the invention.

FIG. 7 shows an embodiment with a clamp dog 10 that has a clamp bump 35 which engages in a complementary cutting-insert recess 36. The cutting insert 11 has further cutting-insert recesses 37 and 38 so that after reversing the tool the clamp recesses 38 can be used or when other clamping tools are used for example for increasing the extension the clamp recess 37 is employed. Also this embodiment implements a plurality of recesses 36–38 engaging respective bump 35 upon clamping.

FIGS. 8 and 9 show a cutting insert 40 which is inserted into a tool holder but not tightened. The clamp dog 10 has on its side turned toward the cutting insert 40 a part-spherical clamp recess 12 with a radius r and a depth T. In addition the clamp dog has on its side turned toward the cutting insert a part-cylindrical recess 41 acting as a guide groove and having a radius $r_1$ and a depth t. The part-spherical cutting-insert bump 13 has a radius R that is greater than the radius r of the part-spherical clamp recess 12. In unclamped condition the cutting insert 40 can be slid with some play along the guide groove 40, this guide hindering tipping of the cutting insert about a longitudinal axis in the view plane. The part-spherically shaped cutting-insert bump 13 assumes during interfitting the position shown in FIG. 9. The width B of the clamp recess 12 is bigger than the width b of the guide groove 41.

FIGS. 10 and 11 show the same arrangement as FIGS. 8 and 9 in clamped condition. As a result of the part-spherical shape of the clamp recess and of the cutting-insert projection which has a relatively large radius of curvature, the cutting-insert projection 13 engages annularly on the outer edge of the clamp recess 12 so that the cutting insert is centered as it is clamped and is after clamping held against shifting in any direction, in particular with respect to an unintentional withdrawal out of the tool holder.

Changes of the scope of the invention are possible such that instead of the described clamp recess and the cutting-insert projection as well as the guide groove other geometric shapes can be used that ensure that on fitting of the cutting insert 40 into the tool holder any tipping of the cutting insert about its longitudinal axis (in the insertion direction) is avoided and after clamping the cutting insert by the clamp dog it is both centered as well as impeded from moving laterally or being pulled out of the tool holder.

We claim:

1. A tool assembly comprising:
   a tool holder having a holder support face;
   a clamping dog having a dog surface spaced from and facing the holder support face;
   a tool between the holder and the dog and having at least one end cutting edge, a face directly confronting the holder support face, and a surface directly confronting the dog surface, one of the surfaces being formed with at least one recess and the other surface being formed with at least one bump engageable in the recess; and
   tightening means engaged between the holder and the dog for pressing the dog surface in a clamping direction generally perpendicular to the faces and surfaces toward the support surface and thereby clamping the tool between the dog and the support, the bump and recess being both substantially part-spherical, the bump having a larger radius of curvature than the recess and engaging the recess in all-around annular contact.

2. The tool assembly defined in claim 1 wherein the bump is formed on the tool surface and the recess on the clamp surface, the clamp surface further being formed with a groove extending from the recess to an end of the dog.

3. The tool assembly defined in claim 2 wherein the groove has a smaller depth than the recess measured in the clamping direction.

4. The tool assembly defined in claim 2 wherein the groove has a narrower width than the recess measured perpendicular to the clamping direction.

5. The tool assembly defined in claim 2 wherein the groove and the bump have a common radius of curvature.

6. The tool assembly defined in claim 2 wherein the groove is part cylindrical.

7. The tool assembly defined in claim 1 wherein the tool is elongated and extending along a longitudinal tool axis, the tool face being formed identically to the tool surface and having another end cutting edge axially opposite the one end cutting edge, so that the cutting edges are formed at opposite ends of the tool, the tool being symmetrical about the longitudinal tool axis, whereby the tool can be reversed on the holder.

8. The tool assembly defined in claim 1 wherein the tool surface is formed with a plurality of the recesses spaced apart along the tool surface and has a pair of cutting edges at opposite ends of the tool.

9. The tool assembly defined in claim 1 wherein the tool face and holder face are formed with generally complementary formations.

10. The tool assembly defined in claim 9 wherein the holder face is formed with a generally prismatic bump.

11. The tool assembly defined in claim 1 wherein the tool has two opposite end cutting edges flanking the tool face and two pairs of side cutting edges, each of the pairs symmetrically flanking the respective end cutting edge.

12. A tool assembly comprising:

a tool holder having a holder support face;

a clamping dog having a dog surface spaced from and facing the holder support face;

an elongated tool extending along a longitudinal axis between the holder and the dog and having:

a face directly confronting the holder support face, and a surface directly confronting the dog surface, one of the surfaces being formed with a recess and the other surface being formed with a bump engageable in the recess, and a lateral projection extending angularly outwardly from the tool and formed with a one side having an end cutting edge and a second side opposite the one side and formed with a back cutting edge, said back and end cutting edges being bridged by a side cutting edge ; and tightening means engaged between the holder and the dog for pressing the dog surface in a clamping direction generally perpendicular to the faces and surfaces toward the support surface and thereby clamping the tool between the dog and the support, the bump and recess being so dimensioned that they engage each other at at least three locations spaced from one another perpendicular to the clamping direction.

13. The tool assembly defined in claim 12 wherein the bump is frustopyramidal thus having four sides.

14. The tool assembly defined in claim 13 wherein the bump has flanks inclined to one another at an angle of between 90° and 150°.

15. The tool assembly defined in claim 13 wherein the frustopyramidal bump has four sides.

16. The tool assembly defined in claim 13 wherein two of the sides are straight and two of the sides are curved.

17. The tool assembly defined in claim 13 wherein all of the sides are straight.

18. The tool assembly defined in claim 13 wherein the frustopyramidal bump has three sides.

19. A tool assembly comprising:

a one-piece tool holder having a flat holder support face;

a clamping dog having a flat dog surface defined between a plurality of respective peripheral edges and spaced from and facing the flat holder support face;

a tool between the holder and the dog and having an end cutting edge, a tool flat face directly confronting the flat support face, and a tool flat surface defined between said cutting edge and a respective plurality of peripheral edges and directly confronting the dog surface, one of the flat surfaces being formed with a recess and the other flat surface being formed with a bump engageable in the recess, said recess and bump being spaced inwardly from the peripheral edges of the respective surfaces; and tightening means engaged between the holder and the dog for pressing the dog surface in a clamping direction generally perpendicular to the flat faces and surfaces toward the support surface and thereby clamping the tool between the dog and the support, the bump and recess being substantially part-spherical and engaging each other in all-around annular contact plane lying perpendicular to the clamping direction.

* * * * *